United States Patent

Matsuzaki et al.

[11] Patent Number: 5,196,960
[45] Date of Patent: Mar. 23, 1993

[54] LENTICULAR LENS SHEET

[75] Inventors: Ichiro Matsuzaki; Hiroshi Kuwada; Masao Otaki; Ken Abe, all of Nakajo, Japan

[73] Assignee: Kuraray Co., Ltd., Kurashiki, Japan

[21] Appl. No.: 784,513

[22] Filed: Oct. 29, 1991

[30] Foreign Application Priority Data

Oct. 29, 1990 [JP] Japan ................ 2-293309

[51] Int. Cl.$^5$ ............................................. G03B 21/60
[52] U.S. Cl. ............................................. 359/453
[58] Field of Search ............ 359/454, 455, 460, 456, 359/452, 453; 425/381.2, 404, 406

[56] References Cited

U.S. PATENT DOCUMENTS 4,859,027  8/1989  Kishida ................ 350/128

*Primary Examiner*—Richard A. Wintercorn
*Attorney, Agent, or Firm*—Oblon, Spivak, McClelland, Maier & Neustadt

[57] ABSTRACT

A double-sided lenticular lens sheet has an entrance lens layer and an exit lens layer, at least said exit lens layer containing light-diffusing fine particles, and has parameters satisfying the following expressions (I) and (II).

$$t_1 > t_2 > 0 \quad \text{(I)}$$

$$0 \leq \frac{\Delta n_1 c_1}{\rho_1 d_1} < \frac{\Delta n_2 c_2}{\rho_2 d_2} \quad \text{(II)}$$

wherein $t_1$ represents a thickness of the entrance lens layer; $t_2$, a thickness of the exit lens layer; $\Delta n_1$, a difference in refractive index between the thermoplastic resin and the light-diffusing fine particles in the entrance lens layer; $\Delta n_2$, a difference in refractive index between the thermoplastic resin and the light-diffusing fine particles in the exit lens layer; $c_1$, a weight concentration of the light-diffusing fine particles in the entrance lens layer; $c_2$, a weight concentration of the light-diffusing fine particles in the exit lens layer; $\rho_1$, a gravity of the light-diffusing fine particles in the entrance lens layer; $\rho_2$, a gravity of the light-diffusing fine particles in the exit lens layer; $d_1$, an average particle diameter of the light-diffusing fine particles in the entrance lens layer; and $d_2$, an average particle diameter of the light-diffusing fine particles in the exit lens layer.

The lenticular lens sheet of the present invention can be used in transmission-type projection screens. It can be stably manufactured even when its pitch is made very small, and yet can ensure a sufficient visual field angle, and also can improve the transmission efficiency of light to obtain a bright picture.

9 Claims, 6 Drawing Sheets

LENTICULAR LENS SHEET

BACKGROUND OF THE INVENTION

1. Field of the Invention

This invention relates to a lenticular lens sheet for a projection screen used in what is called a transmission-type projection television (hereinafter the television is abbreviated as TV) in which a picture is projected to a screen from its back side and the picture transmitted through the screen is viewed on its front side. More particularly, it relates to a lenticular lens sheet used for HDTV projectors or LCD projectors which has a small lenticular pitch (i.e., one cycle of black stripes or light absorbing layers on the exit side; hereinafter simply called a pitch).

2. Description of the Related Art

In transmission screens used in transmission-type projection TVs, lenticular lens sheets are used for the purpose of expanding a visual angle in the horizontal and vertical directions.

The transmission-type projection TVs are commonly constituted of, as shown in FIG. 7, three cathode-ray tubes (CRTs) 9, 10 and 11, of red, green and blue, respectively, arranged side by side in a line; projection magnifying lenses 12, 13 and 14 through which pictures on the respective CRTs are enlarged; and a screen 17 comprised of a Fresnel lens 15 and a lenticular lens 16, on which an enlarged image is formed.

In such constitution, the angle (indicated by ε in FIG. 7) made by straight lines that connect the center of the screen and the center of each projection lens is usually 8° or more, and the angles at which the light rays of the respective colors are incident on the screen 17 are different from one another. Hence, there are problems peculiar to projection TVs such that color tones may change depending on the horizontal position at which the picture on the screen is viewed and color tones may differ at every position on the screen at the fixed horizontal position. The former, a change in color tone, is called a color shift, and a state in which the latter color-tone difference is large is called a poor white uniformity.

In order to make smaller the color shift and improve the white uniformity, what has been conventionally used is a double-sided lenticular lens comprised of, as shown in FIG. 8, an entrance lens 18 comprising a cylindrical lens formed on the entrance surface, an exit lens 19 comprising a cylindrical lens also formed on the exit surface, and a light absorbing layer 20 formed at the light non-convergent part of the exit surface. In this instance, the entrance lens and the exit lens each usually have a shape of a circle, ellipse or hyperbola represented by the following formula (III):

$$Z(x) = \frac{Cx^2}{1 + \{1 - (K + 1)C^2x^2\}^{\frac{1}{2}}} \quad \text{(III)}$$

(wherein C is a main curvature, and K is a conic constant), or have a curve to which a term with a higher order than 2nd order has been added.

In screens making use of such a double-sided lenticular lens 16, it is proposed to specify the positional relationship between the entrance lens 18 and exit lens 19 or the shapes thereof. For example, it is proposed to specify the positional relationship between the entrance lens 18 and exit lens 19 in such a way that the lens surface of one lens is present at the focal point of the other lens (Japanese Patent Applications Laid-open No. 57-81254, No. 57-81255, etc.). It is also proposed to specify the eccentricity of the entrance lens so as to be substantially equal to a reciprocal of refractive index of the material constituting the lenticular lens 16 (Japanese Patent Application Laid-open No. 58-59436). It is still also proposed to combine two sheets of double-sided lenticular lenses in such a way that the optic axis planes of the respective lenticular lenses fall at right angles with each other, and also to form such double-sided lenticular lenses in such a way that the entrance lens and exit lens at the periphery of one of the lenses are asymmetric with respect to the optic axis (Japanese Patent Application Laid-open No. 58-108523). In order to obtain a bright picture, it is proposed to make smaller the region of visual field in the vertical direction of a lens than the region of visual field in the horizontal direction thereof (Japanese Utility Model Publication No. 52-4932). There is also an example in which the position of light convergence only at the valley of an entrance lens is set aside toward the view side from the surface of an exit lens so that the tolerance for disagreement of optic axes and the difference in thickness can be made larger or the color shift can be made smaller (Japanese Patent Application Laid-open No. 1-182837).

Besides these methods in which the positional relationship between the entrance lens 18 and exit lens 19 or shapes thereof are specified, it is also common to uniformly disperse light-diffusing fine particles in the whole lenticular lens sheet so that the visual field angle in the horizontal direction can be ensured mainly by the refraction effect of the lenticular lens, and the visual field angle in the vertical direction, by the diffusibility of the fine particles.

However, to sufficiently ensure the vertical-direction visual field angle by dispersing the light-diffusing fine particles in the lenticular lens may bring about a problem that the picture is blurred because of the scattering of light due to the light-diffusing fine particles. For this reason, it is attempted to produce fine irregularities on the exit surface by various means so that the visual field angle in the vertical direction can be ensured. For example, there are proposals such that no exit lens 19 opposed to the entrance lens 18, as shown in FIG. 8, is formed on the exit surface of a lenticular lens, and beads with refractive index substantially equal to that of a lenticular lens are mixed into the surface of the lenticular lens (Japanese Patent Application Laid-open No. 63-163445), beads with refractive index substantially equal to that of a lenticular lens are mixed into a thermoplastic resin film materal to form a film having fine irregularities on its surface, and the film obtained is thermally contact-bonded to the exit surface of the lenticular lens (Japanese Patent Application Laid-open No. 1-161328), or the exit surface of a lenticular lens is roughed by sandblasting and abrading the inner surface of a mold used for shaping lenticular lenses (Japanese Patent Application Laid-open No. 3-43924).

As described above, various proposals have been hitherto made on lenticular lenses for the purpose of decreasing the color shift or white non-uniformity, brightening pictures and ensuring appropriate visual fields in both the horizontal direction and the vertical direction.

In all of the above lenticular lenses, however, it has been unsettled i) to more increase the transmission efficiency of light to make the picture brighter, and ii) in order to obtain a picture with a high resolution, to make the lens pitch of the lenticular lens very small while maintaining the lens thickness to a certain extent.

Here, increasing the transmission efficiency of light, which is the first-mentioned problem to be settled, has been questioned in the following way: As previously described, the shape of each entrance lens 18 and exit lens of the double-sided lenticular lens as shown in FIG. 8 is represented by the formula (III). In this instance, in order to make the incident light emergent in a good efficiency, the constant K must be $-2 \leq K \leq 1$, and preferably $-0.8 \leq K \leq 0$, and at the same time the light convergence must be improved so as for the light convergent point to be substantially a single point on the exit lens 19 over the whole width of the entrance lens 18 for each lens pitch.

Some conventional lenticular lenses have succeeded in controlling the conic constant K in the formula (III) to be within the above range. However, an attempt to make the light convergent point be substantially a single point on the exit lens 19 over the whole width of the entrance lens 18 has caused the problem that vertical streaks are seen when a screen is viewed from the vicinity of the horizontal visual field angle at which the luminance reasonably decreases in the horizontal direction. Such vertical streaks are caused by the shape unevenness that valleys 18a of the respective entrance lenses in the screen have shapes delicately different one another for the respective lenses. For this reason, in the conventional double-sided lenticular lenses, the shape of the valley 18a is so controlled that the light entering from the valley 18a of the entrance lens is totally reflected on the surface of the exit lens and can not be easily emergent from the exit lens. Hence, in the vicinity of this valley 18a, a lowering of the transmission efficiency of light has been brought about.

Making the lens pitch finer, which is the second-mentioned problem to be settled, has been questioned in the following way: In general, in the double-sided lenticular lenses, the visual field angle in the horizontal direction is substantially determined by the shape of the entrance lens and the thickness of the lenticular lens. Here, in order to make the half visual field angle in the horizontal direction not less than ±37° which is required in usual screens when the light convergent point formed by the entrance lens is substantially in the vicinity of the surface of the exit lens, the thickness of the double-sided lenticular lens must be made not more than 1.1 to 1.3 times the pitch of the entrance lens. As for the projection TVs of the HDTV type having an excellent resolution, the pitch of the lenticular lens is required to be set very small, for example, not more than about 0.6 mm, in order to prevent the horizontal resolution from being adversely affected by a screen. Accordingly, at the pitch of 0.6 mm or less, the thickness of the lenticular lens is required to be made as mall as not more than 0.78 mm, in order to ensure 37° or more for the half visual field angle in the horizontal direction. In the case of LCD projectors, the light non-transmitting portion (dark portion) of each picture element of a liquid crystal panel is so large that the moiré tends to occur because of the arrangement of picture elements and the arrangement of lenticular lens sheets. In order to prevent such moiré, the pitch of the lenticular lens is desired to be made much smaller, for example, not larger than about 0.3 mm. Hence, the thickness of the lenticular lens in this instance is required to be made much smaller.

In extrusion, which is the most efficient method for the mass-production of lenticular lenses, it is difficult to manufacture lenticular lenses with a thickness of 0.78 mm or less, because of a difficulty in the extrusion itself. Even if such extruded products can be obtained, there is the problem that the products tend to be broken.

Meanwhile, it is known that the extrusion can be stably carried out when the extruded product is in a thickness of about 0.9 mm or more. A product extruded in this thickness but in a pitch of not more than 0.6 mm, however, can give no lenticular lens having less color shift at a half visual field angle of 37° or more in the horizontal direction.

To cope with this problem, some may contemplate that, in the lenticular lens like the above, having a thickness of about 0.9 mm or more and a pitch of 0.6 mm or less, the horizontal visual field angle attributable to the lens may be made a little smaller and the horizontal visual field angle corresponding to what has been made small may be compensated by the light diffusion properties of light-diffusing fine particles to obtain the desired large horizontal visual field angle. Such use of light-diffusible fine particles usually tends to bring about a decrease in the color shift, but may cause another problem that their use results in an increase in the light diffusion properties in the interior of the lenticular lens and also results in a decrease in the amount of light reaching to the exit lens itself and an increase in the amount of light reaching to the black stripe region of the exit lens side, to lower the transmission efficiency of light.

SUMMARY OF THE INVENTION

In view of the problems involved in the prior art, an object of the present invention is to make it possible to stably manufacture a lenticular lens sheet used in a projection screen, even when its pitch is made very small, for example, set in the range of 0.6 mm or less, and yet to ensure a sufficient horizontal visual field angle, and also makes it possible to decrease the color shift and improve the transmission efficiency of light so that a bright picture can be obtained.

The above object of the present invention can be achieved by the present invention described below.

The lenticular lens sheet of the present invention is a double-sided lenticular lens sheet comprising an entrance lens layer having an entrance lens, and an exit lens layer having an exit lens whose lens surface is formed at the light convergent point of the entrance lens, or in the vicinity thereof, wherein;

said entrance lens layer and said exit lens layer are each formed of a substantially transparent thermoplastic resin;

at least said exit lens layer contains light-diffusing fine particles; and said lens sheet has parameters satisfying the following expressions (I) and (II).

$$t_1 > t_2 > 0 \quad \text{(I)}$$

$$0 \leq \frac{\Delta n_1 c_1}{\rho_1 d_1} < \frac{\Delta n_2 c_2}{\rho_2 d_2} \quad \text{(II)}$$

wherein $t_1$ represents a thickness of the entrance lens layer; $t_2$, a thickness of the exit lens layer; $\Delta n_1$, a difference in refractive index between the thermoplastic resin and the light-diffusing fine particles in the entrance lens layer; $\Delta n_2$, a difference in refractive index between the thermoplastic resin and the light-diffusing fine particles in the exit lens layer; $c_1$, a weight concentration of the light-diffusing fine particles in the entrance lens layer; $c_2$, a weight concentration of the light-diffusing fine particles in the exit lens layer; $\rho_1$, a gravity of the light-diffusing fine particles in the entrance lens layer; $\rho_2$, a gravity of the light-diffusing fine particles in the exit lens layer; $d_1$, an average particle diameter of the light-diffusing fine particles in the entrance lens layer; and $d_2$, an average particle diameter of the light-diffusing fine particles in the exit lens layer.

DETAILED DESCRIPTION OF THE INVENTION

The present invention will be described with reference to the accompanying drawings.

Figure 1:
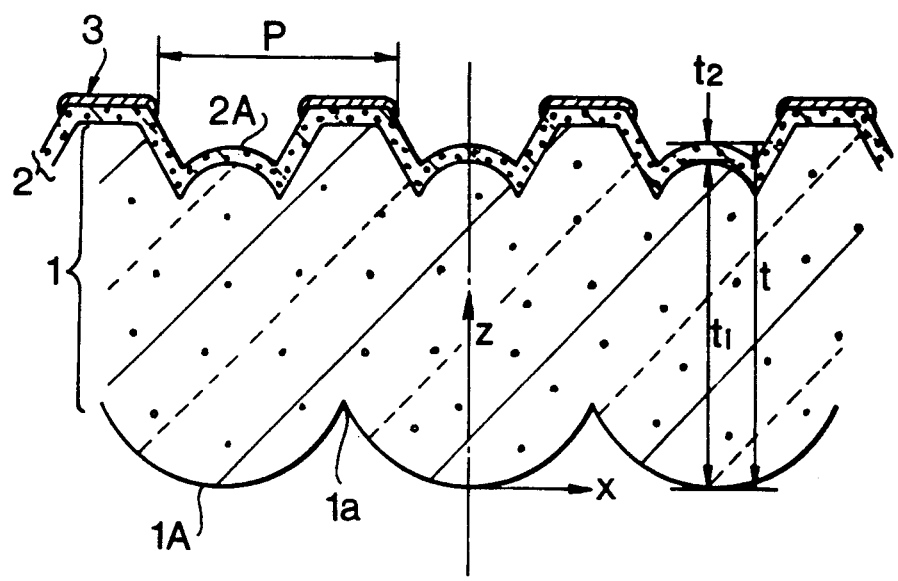
FIG. 1 is an enlarged cross section of an embodiment of the lenticular lens sheet according to the present invention.

FIG. 1 shows an enlarged cross section of the lenticular lens sheet according to the present invention.

As shown in the drawing, the lenticular lens sheet of the present invention is a double-sided lenticular lens comprising an entrance lens layer 1 provided on the light incident side and a exit lens layer 2 provided on the light emergent side. This entrance lens layer 1 is formed of a plurality of entrance lenses 1A comprising a cylindrical lens. The exit lens layer 2 is formed of a plurality of exit lens layers 2A each having a lens surface at the light convergent point of each lens of the entrance lens layer, or in the vicinity thereof. A light absorbing layer 3 is also formed at the light non-convergent part of the exit lens layer 2.

The entrance lens layer 1 and exit lens layer 2 as described above are each formed of a substantially transparent thermoplastic resin. At least the exit lens layer 2 contains light-diffusing fine particles. The entrance lens layer 1 may optionally contain the light-diffusing fine particles. In either case, the light-diffusing fine particles contained in each layer need not be of a single kind or the same kind. Any two or more kinds of light-diffusing fine particles with different physical properties may be mixed in the layer or layers in any combination. In the both layers, light-diffusing fine particles with refractive index different from each other may also be used.

The lenticular lens sheet of the present invention satisfies the following expressions (I) and (II), in respect of the following parameters.

$$t_1 > t_2 > 0 \quad \text{(I)}$$

$$0 \leq \frac{\Delta n_1 c_1}{\rho_1 d_1} < \frac{\Delta n_2 c_2}{\rho_2 d_2} \quad \text{(II)}$$

wherein $t_1$ represents a thickness of the entrance lens layer; $t_2$, a thickness of the exit lens layer; $\Delta n_1$, a difference in refractive index between the thermoplastic resin and the light-diffusing fine particles in the entrance lens layer; $\Delta n_2$, a difference in refractive index between the thermoplastic resin and the light-diffusing fine particles in the exit lens layer; $c_1$, a weight concentration of the light-diffusing fine particles in the entrance lens layer; $c_2$, a weight concentration of the light-diffusing fine particles in the exit lens layer; $\rho_1$, a gravity of the light-diffusing fine particles in the entrance lens layer; $\rho_2$, a gravity of the light-diffusing fine particles in the exit lens layer; $d_1$, an average particle diameter of the light-diffusing fine particles in the entrance lens layer; and $d_2$, an average particle diameter of the light-diffusing fine particles in the exit lens layer.

Herein, $\Delta n \cdot c / \rho d$ represents light diffusion properties attributable to the light-diffusing fine particles.

More specifically, the magnitude of light diffusion properties is known to be expressed approximately by the formula: $S \cdot \Delta n \cdot c$ (wherein $S$ is specific cross-sectional area cm$^2$/g). The number $m$ per gram of the light-diffusing fine particles is:

$$m = \frac{1}{\frac{4}{3}\pi(d/2)^3 \rho},$$

and the specific cross-sectional area per particle of the light-diffusing fine particles is $\pi(d/2)^2$. Hence, it follows that:

$$S = \frac{\pi(d/2)^2}{m} = \frac{3}{2d\rho}$$

Therefore, it follows that $S\Delta nc = \frac{3\Delta nc}{2d\rho}$, and hence the light diffusion properties are approximately proportional to $$\frac{\Delta nc}{d\rho}.$$

The lenticular lens sheet of the present invention is characterized in that the light diffusion properties expressed by $$\frac{\Delta nc}{d\rho}$$

attributable to the light-diffusing fine particles is made stronger in the exit lens layer 2 than in the entrance lens layer 1 as expressed by the formula (II), and the thickness $t_2$ of the exit lens layer 2 is made smaller than that of the entrance lens layer 1 as expressed by the formula (I).

Thus, in the case when the light diffusion properties of the exit lens layer 2 is made stronger than those of the entrance lens layer 1, it is preferred that the thickness $t_2$ of the exit lens layer 2 is controlled to be 40 μm < $t_2$ < 500 μm, and the light diffusion properties to be as follows:

$$0 \leq \left(\frac{\Delta n_1 c_1}{\rho_1 d_1}\right) \bigg/ \left(\frac{\Delta n_2 c_2}{\rho_2 d_2}\right) < 0.5$$

It is more preferred that the difference in thickness between the both layers and the difference in light diffusion properties between them is as large as possible so long as there is no problem in the manufacture or in the characteristics as a screen. The light diffusion properties of the entrance lens layer 1 may be zero. Making stronger the light diffusion properties of the exit lens layer 2 in this way in the present invention enables more improvement in the effect of the present invention. This will be detailed below.

Some conventional double-sided lenticular lenses have made use of light-diffusing fine particles for the purpose of expanding the visual field angles in both the vertical direction and the horizontal direction. In such lenticular lenses, however, the light-diffusing fine particles are commonly dispersed in the whole double-sided lenticular lens.

Figure 8:
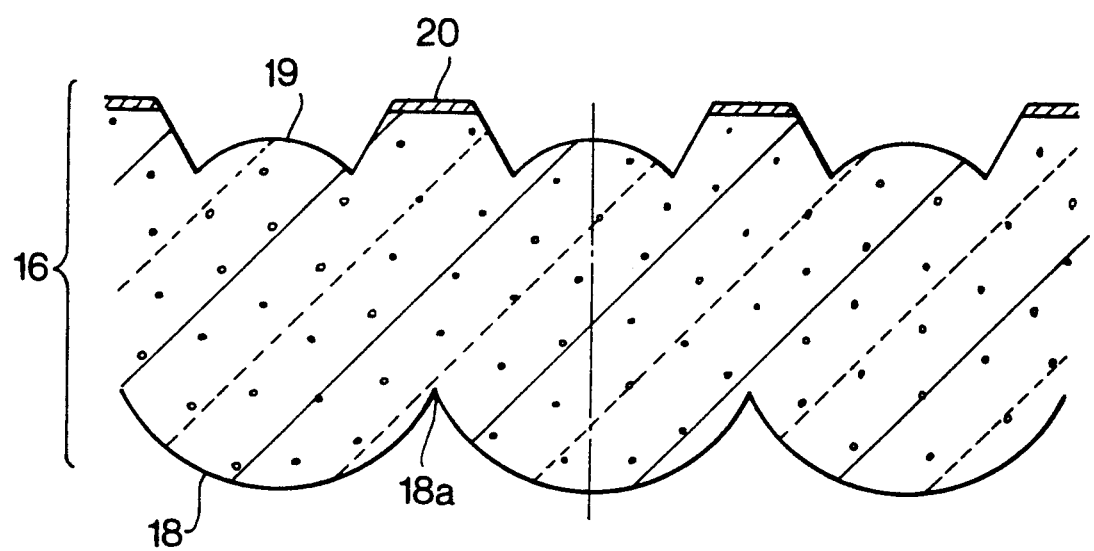
FIG. 8 is an enlarged cross section of a conventional lenticular lens.

Hence, an attempt to greatly expand the visual field angles by utilizing the light-diffusing fine particles may cause great scattering of the light in the course the light passes through the inside of the lenticular lens, and, as shown in FIG. 8 previously referred to, may result in an increase in the amount of light reaching the light absorbing layer 20 provided on the exit surface of the lenticular lens, bringing about a lowering of the transmission efficiency of light. On the other hand, in the lenticular lens sheet of the present invention, the light is scattered locally within the exit lens layer 2 formed in a small thickness. Hence, any possible increase in the scattering of light in this exit lens layer 2 may give only a smaller proportion or amount of the light that reaches the light absorbing layer. Hence it becomes possible to minimize the lowering of the transmission efficiency of light and at the same time increase the visual field angle by virtue of the light-diffusing fine particles.

In the lenticular lens sheet of the present invention, since the visual field angle can be increased by making stronger the light diffusion properties of the exit lens layer 2 as described above, the intended horizontal visual field angle can be attained even when the horizontal visual field angle that depends on the shapes of the entrance and exit lenses is designed to be somewhat smaller than the angle in the prior art. Hence, the horizontal visual field angle attributable to the shape of a lens may be made smaller than that of the conventional lenticular lens sheet, whereby it becomes possible to make larger the thickness of the entrance lens 1A even in the same pitch as in the conventional lens sheet. This enables stable manufacture of even the lenticular lens sheet having a very small pitch, for example, a pitch of 0.6 mm or less.

With regard to the moiré caused by the Fresnel lens and the lenticular lens, it is known that the moiré can be decreased by providing a light diffusion layer of a lenticular lens at a position as distant as possible from the exit surface of the Fresnel lens. In the lenticular lens sheet of the present invention, the light diffusion layer is provided in the manner localized to the light exit surface, and hence the present invention can also be effective for decreasing the moiré.

In the lenticular lens sheet of the present invention, the light diffusion properties of the exit lens layer 2 are made stronger. Hence, the lens sheet of the present invention can also be free from the vertical streaks that appear on the screen as in the conventional cases, even when, in order to improve the light convergent properties attributable to the entrance lens 1A, the entrance lens 1A is so made as to have the shape that may make the light convergent point substantially single in the vicinity of the surface of the exit lens over the whole width of the entrance lens. In other words, such vertical streaks are sufficiently made faint because of the strong light diffusion properties of the exit lens layer 2, and hence can not come into question in practice. Accordingly, in the present invention, the entrance lens 1A can be so made as to have the shape that may make the light convergent point substantially single in the vicinity of the surface of the exit lens over the whole width of the entrance lens. In addition, in the present invention, the entrance lens 1A can be so made as to have the shape such that the conic constant K in the formula (III) previously described can satisfy the relationship of $-0.8 \leq K \leq 0$ over the whole width of the lens. Thus, it becomes possible to improve the light convergent properties and also improve the transmission efficiency of light.

As described above, according to the present invention, the exit lens layer 2 is formed in a small thickness and also its light diffusion properties are made stronger, so that the transmission efficiency of light can be improved, the visual field angle can be increased and the lens pitch can be made finer. In this instance, the parameters that determine the light diffusion properties should preferably be set within the following scope.

That is, with regard to the entrance lens layer 1 and the exit lens layer 2, both the differences $\Delta n_1$ and $\Delta n_2$ in refractive index between the thermoplastic resin and the light-diffusing fine particles should preferably be not less than 0.01 and not more than 0.12. If the difference in refractive index is less than 0.01, the vertical directionality characteristics of light may be so poor that the vertical region within which a screen can have a suitable brightness may become narrower at the peripheral portion of the whole screen. This requires an increased quantity of the light-diffusing fine particles that are necessary to obtain the desired light diffusion properties, and hence is not preferable from the economical viewpoint and also from the viewpoint of mechanical strength. If the difference in refractive index is more than 0.12, the screen may become bright at the peripheral portion of the whole screen and also the visual field angle may become larger, but the rate of changes in luminance in the small vertical angle may become large undesirably. This may also result in a decrease in the amount of light-diffusing fine particles added, so that a bright horizontal band called a hot band tends to appear undesirably.

With regard to the weight concentration of the light-diffusing fine particles, they may preferably be in a concentration of not less than 0% by weight and not more than 3% by weight in the entrance lens layer 1. In usual instances, it is preferred for the light-diffusing fine particles not to be dispersed in the layer, i.e., to be in a concentration of 0% by weight. This is because, in the present invention, the good effect as stated above can be obtained by making the light diffusion properties stronger in the exit lens layer 2. As for their concentration in the exit lens layer 2, the weight concentration $c_2$ of the light-diffusing fine particles should preferably be controlled to be not less than 3% by weight so that the light diffusion properties can be made sufficiently stronger.

The light-diffusing fine particles may preferably have an average particle diameter of not less than 4 $\mu$m and not more than 30 $\mu$m in respect of both the entrance lens layer 1 and the exit lens layer 2. An average particle diameter less than 4 $\mu$m may make it possible to use the light-diffusing fine particles in a smaller quantity in order to obtain the desired light diffusion properties, but tends to bring about a lowering of color temperature characteristics. On the other hand, an average particle diameter more than 30 $\mu$m is not preferably for economical reasons since it makes it necessary to use the light-diffusing fine particles in a larger quantity in order to obtain the desired light diffusion properties. Such a diameter is also not preferable since it may bring about a lowering of light diffusion properties.

Figure 2:
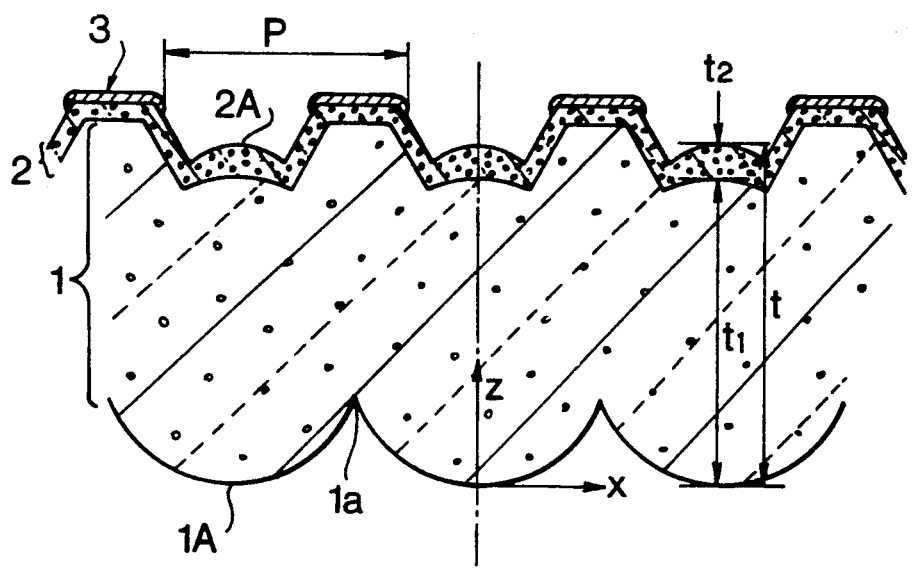
FIG. 2 is an enlarged cross section of another embodiment of the lenticular lens sheet according to the present invention.
Figure 3:
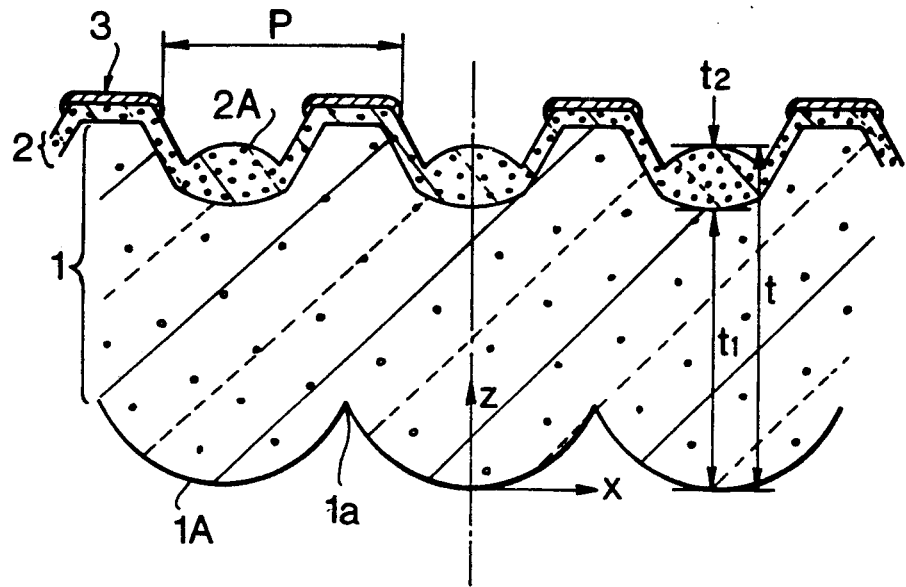
FIG. 3 is an enlarged cross section of still another embodiment of the lenticular lens sheet according to the present invention.

The exit lens layer 2 in the present invention may preferably be formed in such a manner that its thickness at the center of each exit lens 2A becomes gradually smaller with approach to the periphery. FIGS. 2 and 3 are enlarged cross sections of the lenticular lens sheets thus formed. In the lenticular lens sheet shown in FIG. 2, the light transmitting part of the exit lens 2A is crescent-shaped, and the center of the exit lens 2A has a larger thickness than the periphery thereof, compared with the lens shown in FIG. 1. In the lenticular lens sheet shown in FIG. 3, the center of the exit lens 2A has a more larger thickness than the periphery thereof, compared withe the lens shown in FIG. 2.

Figure 5A:
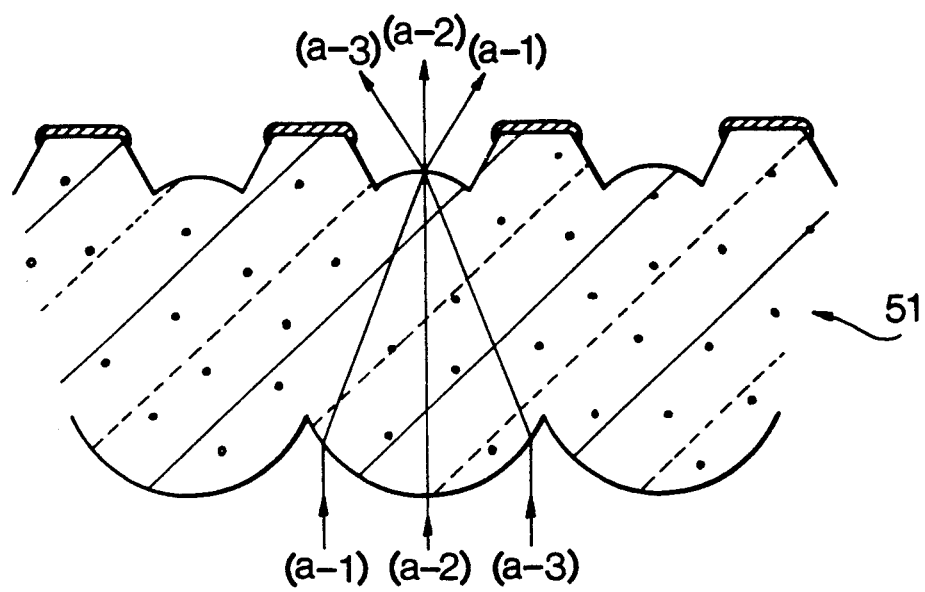
FIGS. 5A to 5D illustrate the relationship between the thickness of the exit lens and the luminance characteristics in the horizontal direction.
Figure 5B:
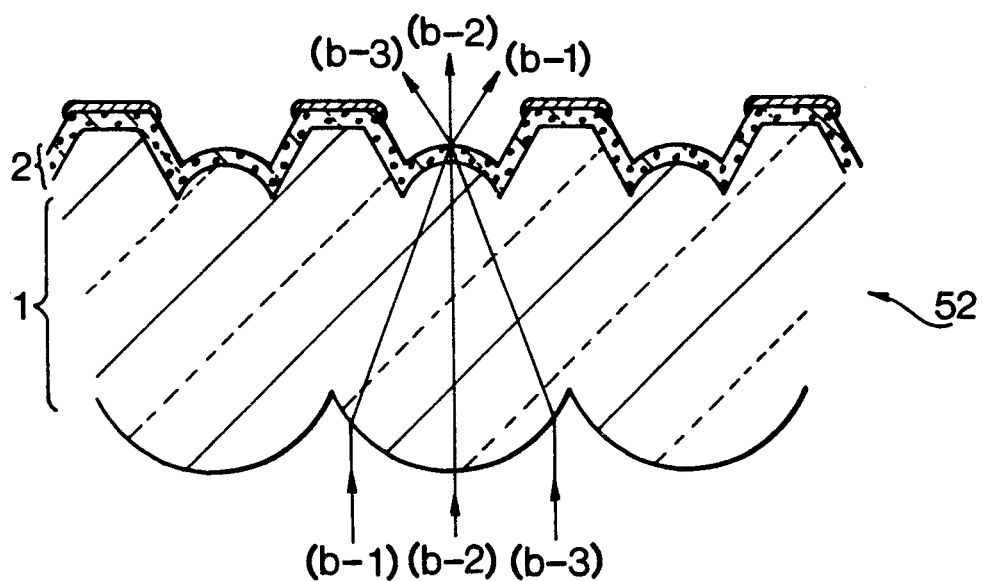
Figure 5C:
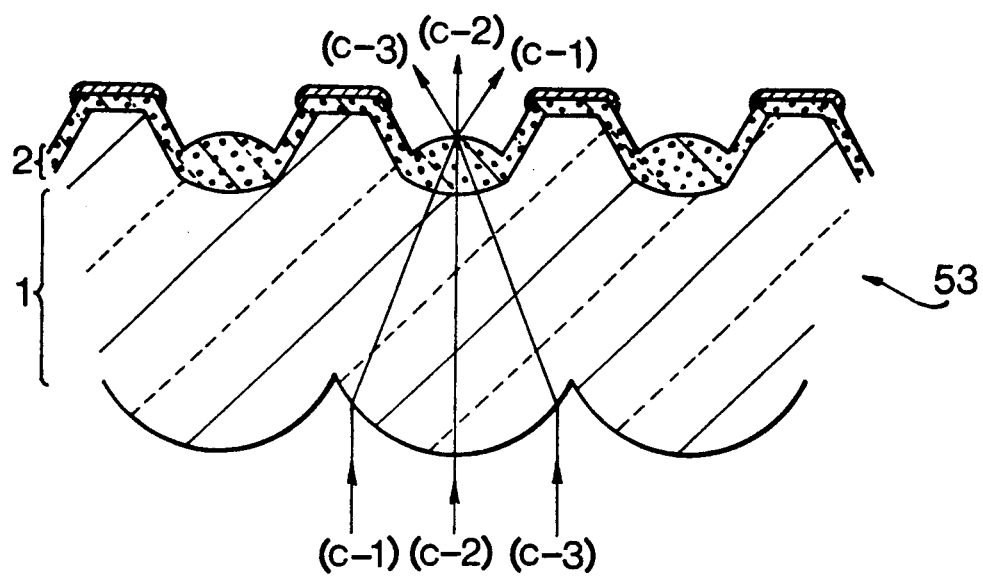

The reason why the center of the exit lens 2A is made to have a larger thickness will be described with reference to FIGS. 5A to 5D. FIGS. 5A, 5B and 5C illustrate cross sections of three types of lenticular lens sheets constituted in the manner different from one another. Of these, FIG. 5A shows a lenticular lens sheet 51 constituted in a conventional manner, in which no exit lens layer is formed. FIG. 5B shows a lenticular lens sheet 52 according to the present invention, constituted in a double-layer structure having the entrance lens layer 1 and the exit lens layer 2, in which the exit lens layer 2 has a substantially uniform thickness as a whole. FIG. 5C shows a lenticular lens sheet 53 according to the present invention, constituted in a double-layer structure having the entrance lens layer 1 and the exit lens layer 2, in which the exit lens layer 2 has a thickness that becomes larger with approach to the center of the lens. Herein, the lenticular lens sheet 51 is so formed as to contain the light-diffusing fine particles dispersed throughout the whole, while the lenticular lens sheets 52 and 53 are each so formed as to contain the light-diffusing fine particles dispersed only in the exit lens layer 2.

Figure 5D:
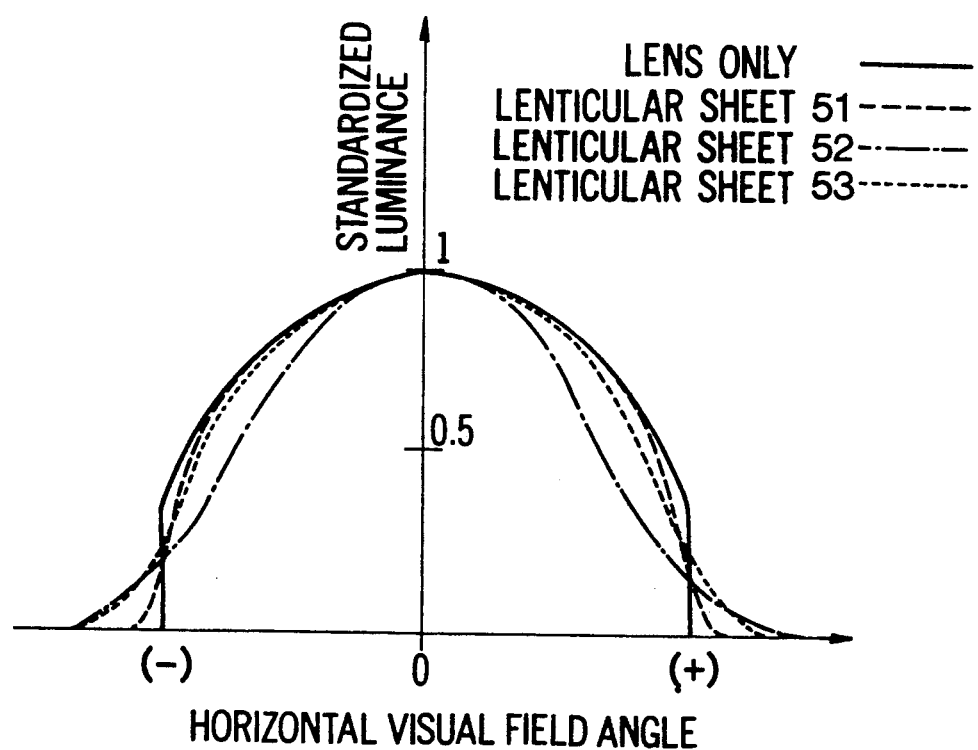

In the lenticular lens sheet 51 shown in FIG. 5A, the path lengths of the light passing through the medium in which the light-diffusing fine particles have been dispersed are substantially equal one another in respect of light paths (a-1), (a-2) and (a-3). Hence, in any of these light paths, the light is diffused to the same extent. Therefore, as shown in FIG. 5D by a broken line, the luminance characteristics in the horizontal direction becomes almost substantially the same as the luminance characteristics of the lens only.

In the lenticular lens sheet 52 shown in FIG. 5B, the path lengths of the light passing through the medium in which the light-diffusing fine particles have been dispersed are shorter in light path (b-2) than in light paths (b-1) and (b-3). Hence, the light on light path (b-2) becomes less diffusible. Therefore, as shown in FIG. 5D by a chain line, the luminance characteristics in the horizontal direction show a little lowered half visual field angle.

In the lenticular lens sheet 53 shown in FIG. 5C, all the path lengths (c-1), (c-2) and (c-3) of the light passing through the medium in which the light-diffusing fine particles have been dispersed have uniformity approximate to those in the constitution of the lenticular lens sheet 51. Hence, the luminance characteristics in the horizontal direction becomes approximate to the characteristics of the lenticular lens sheet 51, and yet the extent to which the light is diffused by virtue of the light-diffusing fine particles is smaller than the case of the lenticular lens sheet 51. Therefore, as shown in FIG. 5D by a dotted line, the luminance characteristics showing a more trailed skirt than those in the constitution of the lenticular lens sheet 51 can be obtained by controlling the concentration of light-diffusing fine particles so that the same screen gain can be set up.

Thus, the lenticular lens sheet with the constitution of the lenticular lens sheet 53 can achieve a high transmission efficiency of light and also substantially the same half visual field angle in the luminance characteristics in the horizontal direction.

Figure 4:
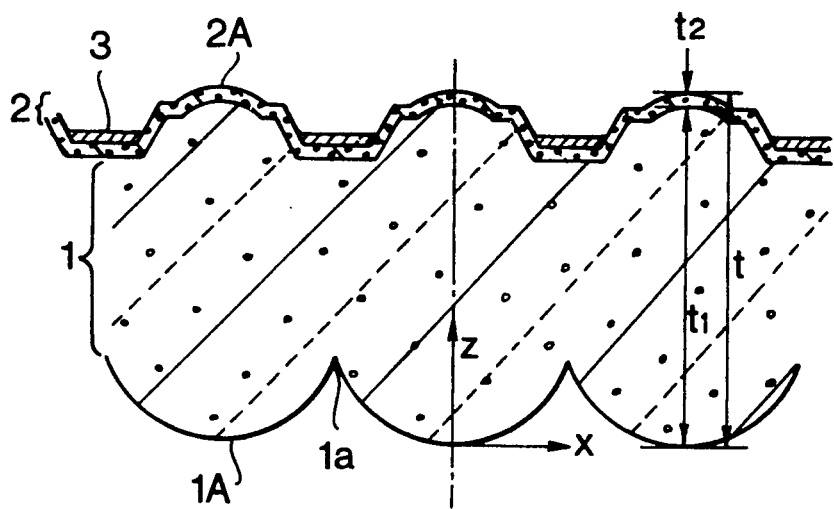
FIG. 4 is an enlarged cross section of a further embodiment of the lenticular lens sheet according to the present invention.

In the lenticular lens sheet of the present invention, the light absorbing layer 3 formed on the light non-convergent part of the exit lens layer 2 may be formed on the convex portion of the exit lens layer 2 as shown in FIG. 1, or may be formed on the concave portion of the exit lens layer 2 as shown in FIG. 4. More specifically, in the case when the light absorbing layer is formed on the convex portion of the exit lens layer 2, the convex portion must be formed to have a height so adjusted that the emergent light is not intercepted by the side wall of the convex portion. This is preferable because it is easy to do so in the manufacture when the lens pitches are relatively large. On the other hand, in the case when the lens pitches are made finer, the difference between the height of the convex portion and the height of the exit lens must be made smaller in proportion to the size of pitches, and hence a difficulty may arise in the manufacture. To overcome this difficulty, the light absorbing layer may be formed on the concave portion of the exit lens layer 2 as shown in FIG. 4. This is preferable because, although its manufacture may be complicated compared with the case in which the light absorbing layer is formed on the convex portion, the emergent light is by no means intercepted even when the lens pitches are made finer, and hence the transmission efficiency of light can be improved.

A manner by which the lenticular lens sheet of the present invention is manufactured will be described below.

The manner by which the lenticular lens sheet having the double-layer structure as in the present invention is manufactured may include a lamination method in which resin materials that form the respective layers are separately extruded from a die into films, which are then bonded, followed by shaping; and a co-extrusion method in which resin layers that give the respective lens layers are superposed before they are extruded from a die, and then extruded in the state they are superposed, followed by shaping using engraved shaping rolls. In some embodiment of the lamination method, a material for at least one layer may be formed into a film, which is then brought into adhesion to the other layer, followed by shaping. Of these methods, the co-extrusion method is advantageous as the method of manufacturing the lenticular lens sheet of the present invention. The reason therefor is as follows: In the first place, in the lenticular lens sheet of the present invention, the light-diffusing fine particles must be dispersed in the exit lens layer in a high concentration. If the film corresponding to the exit lens layer is formed by the lamination method, it is difficult for the layer to retain the form of a film when the light-diffusing fine particles are dispersed in the film in a high concentration. On the other hand, in the co-extrusion method, there is no problem because, when extruded, the resin layer that gives the exit lens layer has been already brought into adhesion to the resin layer that gives the entrance lens layer having a larger thickness. Secondly, in the case of the co-extrusion method, the two resin layers are inserted to the engraved shaping rolls in the molten state kept in the die. Hence, it becomes readily possible to obtain the lenticular lens sheet whose exit lens portion of the exit lens layer 2 has a thickness distribution, having a larger thickness at the center of the exit lens as shown in FIGS. 2 and 3.

EXAMPLES

The present invention will be described below in greater detail by giving examples.

Example 1

A lenticular lens sheet with the structure as shown in FIG. 1 was produced. In this instance, the lenticular lens sheet was made to have a pitch p of 0.6 mm, a total thickness t of 0.95 mm, an entrance lens layer thickness $t_1$ of 0.8 mm and an exit lens layer thickness $t_2$ of 0.15 mm. Polymethyl methacrylate was used as the thermoplastic resin for the entrance lens layer 1, and, as the light-diffusing fine particles contained therein, inorganic fine particles (BG210; trade name; glass beads produced by Toshiba-Ballotini Company Limited; n=1.52) with a particle diameter $d_1$ of 17 μm and a difference in refractive index between the thermoplastic resin and the light-diffusing fine particles $\Delta n_1$ of 0.026 were used in an amount $c_1$ of 0.5% by weight.

Polymethyl methacrylate (PMMA) was also used as the thermoplastic resin for the exit lens layer 2, and, as the light-diffusing fine particles contained therein, organic fine particles (SBX-8; trade name; styrene type copolymer resin fine particles produced by Sekisui Chemical Co., Ltd.; n=1.595) with a particle diameter $d_2$ of 8 μm and a difference in refractive index between the thermoplastic resin and the light-diffusing fine particles $\Delta n_2$ of 0.1 were used in an amount $c_2$ of 4.0% by weight.

The lens shape was made to have, in the formula (III) previously described, a main curvature C of 3.2 and a conic constant K of −0.45 on the entrance side and a main curvature C of −2.9 and a conic constant K of 3.5 on the exit side.

Figure 6:
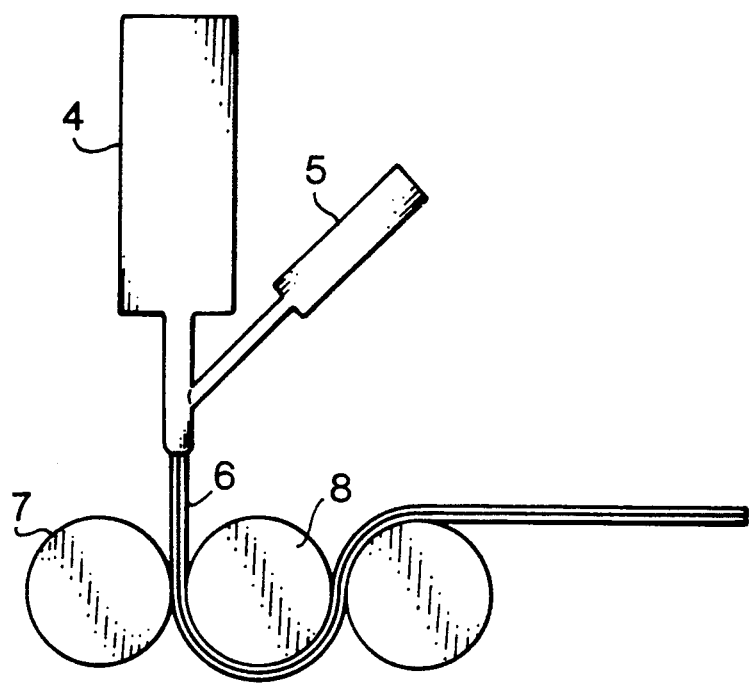
FIG. 6 illustrates a method of making the lenticular lens sheet of the present invention.
Figure 7:
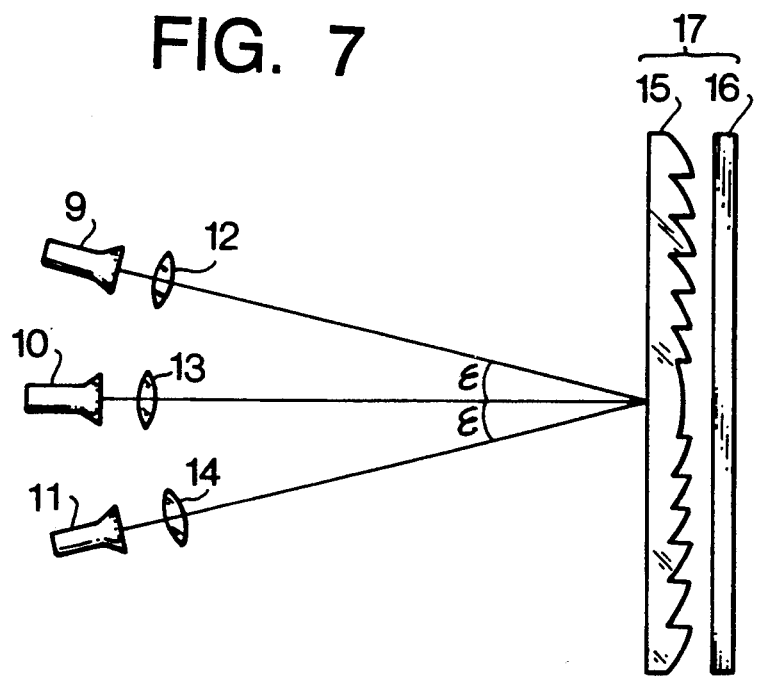
FIG. 7 is a schematic view to illustrate the constitution of a transmission-type projection TV.

Such a lenticular lens sheet was produced by co-extrusion using the extruder as shown in FIG. 6. More specifically, this extruder is comprised of a main extruder 4 from which the entrance lens layer 1 is extruded and a secondary extruder 5 from which the exit lens layer 2 is extruded. Two layers of resin sheets 6 were respectively extruded from the both extruders 5 and 6 and flowed to the interface between a pair of engraved rolls 7 and 8 previously provided with the shapes of the lenticular lens sheet. The thicknesses of the two layers were controlled by making adjustment of the amount of extrusion from the extruder. On the sheet thus formed by extrusion, a light absorbing layer was printed by a conventional method.

The lenticular lens sheet thus produced was combined with a Fresnel lens, and an image formed was evaluated to confirm that a screen with a better resolution than the conventional one was obtained. The total light ray transmittance was also measured to reveal that it was 84%. Thus it became clear that the screen caused only a small loss in the amount of light.

Example 2

A lenticular lens sheet with the structure as shown in FIG. 3 was shaped with a pitch p of 0.3 mm and a total thickness t of 0.9. In this instance, the thermoplastic resins and the light-diffusing fine particles used in the entrance lens layer 1 and the exit lens layer 2 were the same as those used in Example 1. The sheet was formed in the same manner as in Example 1, by co-extrusion using the extruder as shown in FIG. 6. In the extrusion, the resins extruded from the main extruder 4 and the secondary extruder 5 were made to have a temperature of 230° C. right before extrusion. The first engraved roll 7 was set to a temperature of 35° C., and the second engraved roll 8, to a temperature of 100° C.

In the same way as in Example 1, the lenticular lens sheet thus produced was combined with a Fresnel lens, and an image formed was evaluated to confirm that a screen with a better resolution than the conventional one was obtained.

Example 3

The lenticular lens sheet as shown in FIG. 4 was produced. The pitch, the thickness, as well as the properties of the resin and fine particles and the shape of lenses were all the same as those in Example 1.

In the same way as in Example 1, the lenticular lens sheet thus produced was combined with a Fresnel lens, and an image formed was evaluated to confirm that a screen with a better resolution than the conventional one was obtained.

Example 4

A lenticular lens sheet with the structure as shown in FIG. 4 was produced. The lens sheet was made to have a pitch p of 0.3 mm, a total thickness t of 0.9 mm, $t_1$ of 0.7 mm and $t_2$ of 0.2 mm. Polymethyl methacrylate was used as the thermoplastic resin for the entrance lens layer 1, and, as the light-diffusing fine particles contained therein, inorganic fine particles (BG210; trade name; glass beads produced by Toshiba-Ballotini Company Limited; n=1.52) with $d_1$ of 17 μm and $\Delta n_1$ of 0.026 were used in an amount $c_1$ of 0.5% by weight.

Polymethyl methacrylate was also used as the thermoplastic resin for the exit lens layer 2, and, as the light-diffusing fine particles contained therein, organic fine particles (SBX-8; trade name; styrene type copolymer resin fine particles produced by Sekisui Chemical Co., Ltd.; n=1.595) with $d_2$ of 8 μm and $\Delta n_2$ of 0.1 were used in an amount $c_2$ of 6.0% by weight.

The lens shape was made to have, in the formula (III) previously described, a main curvature C of 2.7 and a conic constant K of −0.45 on the entrance side and a main curvature C of −8.0 and a conic constant K of 0 on the exit side.

Thus, in this example, the curvature radius of the exit lens layer 2 was made smaller in order to increase the horizontal visual field angle. In the case when the converging angle ε is large as in usual three-tube CRT type projectors, the color shift becomes so large that there is a problem when used as a screen. However, in the case when a projector has one projection lens as in liquid crystal projectors or the converging angle ε is small even if a projector has three projection lenses, the color shift can be small. Thus, a lenticular lens sheet suitable as a screen was obtained. More specifically, the lenticular lens sheet thus produced was combined with a Fresnel lens, and a picture was projected using a liquid crystal projector. As a result, the lenticular lens sheet served as a good screen with less moiré. In this projection, the pitch of liquid crystal picture elements on the screen surface was set to be four times the pitch of the lenticular lens sheet.

Examples 5 to 12

The parameters of the lenticular lens sheet were varied as shown in Table 1 to produce lenticular lens sheets by co-extrusion in the same way as in Example 1. In regard to the lens sheets thus obtained, the horizontal half visual field angle and the total light ray transmittance were measured.

Results obtained are shown together in Table 1.

From these results, it was confirmed that the horizontal visual field angle and the total light ray transmittance were improved in the examples of the present invention particularly when the parameters were set as follows (Examples 7 to 11):

$$0 \leq \frac{\Delta n_1 c_1}{\rho_1 d_1} / \frac{\Delta n_2 c_2}{\rho_2 d_2} < 0.5$$

$c_1 \leq 3\%$ by weight, $c_2 \geq 3\%$ by weight

In the foregoing examples, it was possible to stably produce all the formed products of the lenticular lens sheets without causing any cracks in the product.

TABLE 1-1

| Example: | Pitch (mm) | Total thickness (mm) | Shape of entrance lens C | K | Shape of exit lens C | K |
|---|---|---|---|---|---|---|
| 5 | 0.6 | 0.95 | 3.2 | −0.45 | −2.9 | 3.5 |
| 6 | 0.6 | 0.95 | 3.2 | −0.45 | −2.9 | 3.5 |
| 7 | 0.6 | 0.95 | 3.2 | −0.45 | −2.9 | 3.5 |
| 8 | 0.6 | 0.95 | 3.2 | −0.45 | −2.9 | 3.5 |
| 9 | 0.6 | 0.95 | 3.2 | −0.45 | −2.9 | 3.5 |
| 10 | 0.3 | 0.9 | 2.7 | −0.45 | −8.0 | 0 |
| 11 | 0.3 | 0.9 | 2.7 | −0.45 | −8.0 | 0 |
| 12 | 0.3 | 0.9 | 2.7 | −0.45 | −8.0 | 0 |

TABLE 1-2

| Example: | Base resin | Light-diffusing fine particles | $d_1$ | $\Delta n_1$ | $c_1$ | $\rho_1$ | $t_1$ |
|---|---|---|---|---|---|---|---|
| 5 | PMMA (n = 1.494) | GB210 | 17 | 0.026 | 0.5 | 2.5 | 0.8 |
| 6 | PMMA | GB210 | 17 | 0.026 | 3.0 | 2.5 | 0.8 |
| 7 | PMMA | GB210 | 17 | 0.026 | 0.5 | 2.5 | 0.8 |
| 8 | PMMA | None | — | — | — | — | 0.75 |
| 9 | PMMA | None | — | — | — | — | 0.75 |
| 10 | PMMA | GB210 | 17 | 0.026 | 0.5 | 2.5 | 0.7 |
| 11 | PMMA | None | — | — | — | — | 0.7 |
| 12 | PMMA | GB210 | 17 | 0.026 | 3.5 | 2.5 | 0.7 |

PMMA: Polymethyl methacrylate
GB210: (trade name; glass beads produced by Toshiba-Ballotini Company Limited; n = 1.52)

TABLE 1-3

| Example: | Base resin | Light-diffusing fine particles | $d_2$ | $\Delta n_2$ | $c_2$ | $\rho_2$ | $t_2$ |
|---|---|---|---|---|---|---|---|
| 5 | PMMA | SBX-17 | 12 | 0.101 | 4.0 | 1.044 | 0.15 |
| 6 | PMMA | SBX-17 | 12 | 0.101 | 0.4 | 1.044 | 0.15 |
| 7 | PMMA | SBX-17 | 12 | 0.101 | 4.0 | 1.044 | 0.15 |
| 8 | PMMA | EGB731 | 17 | 0.067 | 20.0 | 2.5 | 0.2 |
| 9 | MS | SBX-17 | 12 | 0.065 | 5.5 | 1.044 | 0.2 |
| 10 | PMMA | SBX-17 | 12 | 0.101 | 4.5 | 1.044 | 0.2 |
| 11 | PMMA | EGB731 | 17 | 0.067 | 20.0 | 2.5 | 0.2 |
| 12 | PMMA | SBX-17 | 12 | 0.101 | 0.5 | 1.044 | 0.2 |

PMMA: Polymethyl methacrylate
MS: Methyl methacrylate/styrene copolymer resin; n = 1.53)
SBX-8 (trade name; styrene type copolymer resin fine particles produced by Sekisui Chemical Co., Ltd.; n = 1.595)
EGB731 (trade name; glass beads produced by Toshiba-Ballotini Company Limited Co., Ltd.; n = 1.561)

TABLE 1-4

| Example: | $\frac{\Delta n_1 c_1}{\rho_1 d_1} / \frac{\Delta n_2 c_2}{\rho_2 d_2}$ | Print position of light absorbing layer | Horizontal half angle (°) | Total light ray transmittance (%) |
|---|---|---|---|---|
| 5 | 0.0095 | Convex | ±38 | 87 |
| 6 | 0.569 | Convex | ±30 | 81 |
| 7 | 0.0095 | Concave | ±38 | 87 |
| 8 | 0 | Convex | ±39 | 88 |
| 9 | 0 | Convex | ±37 | 88 |
| 10 | 0.0084 | Convex | ±37 | 86 |
| 11 | 0 | Convex | ±37 | 87 |
| 12 | 0.531 | Convex | ±30 | 81 |

What is claimed is:

1. A double-sided lenticular lens sheet comprising an entrance lens layer having an entrance lens, and an exit lens layer having an exit lens whose lens surface is formed at the light convergent point of the entrance lens, or in the vicinity thereof, wherein;
said entrance lens layer and said exit lens layer are each formed of a substantially transparent thermoplastic resin;
at least said exit lens layer contains light-diffusing fine particles; and
said lens sheet has parameters satisfying the following expressions (I) and (II).

$$t_1 > t_2 > 0 \qquad (I)$$

$$0 \leq \frac{\Delta n_1 c_1}{\rho_1 d_1} < \frac{\Delta n_2 c_2}{\rho_2 d_2} \qquad (II)$$

wherein $t_1$ represents a thickness of the entrance lens layer; $t_2$, a thickness of the exit lens layer; $\Delta n_1$, a difference in refractive index between the thermoplastic resin and the light-diffusing fine particles in the entrance lens layer; $\Delta n_2$, a difference in refractive index between the thermoplastic resin and the light-diffusing fine particles in the exit lens layer; $c_1$, a weight concentration of the light-diffusing fine particles in the entrance lens layer; $c_2$, a weight concentration of the light-diffusing fine particles in the exit lens layer; $\rho_1$, a gravity of the light-diffusing fine particles in the entrance lens layer; $\rho_2$, a gravity of the light-diffusing fine particles in the exit lens layer; $d_1$, an average particle diameter of the light-diffusing fine particles in the entrance lens layer; and $d_2$, an average particle diameter of the light-diffusing fine particles in the exit lens layer.

2. The lenticular lens sheet according to claim 1, wherein the thickness $t_2$ of the exit lens layer is 40 $\mu m < t_2 < 500$ $\mu m$.

3. The lenticular lens sheet according to claim 1 or 2, wherein said lens sheet satisfies the following expression.

$$0 \leq \left(\frac{\Delta n_1 c_1}{\rho_1 d_1}\right) \bigg/ \left(\frac{\Delta n_2 c_2}{\rho_2 d_2}\right) < 0.5$$

4. The lenticular lens sheet according to claim 1 or 2, wherein said lens sheet satisfies the following expression.

$$0.01 \leq \Delta n_1 \leq 0.12$$
$$0 \leq c_1 \leq 3\% \text{ by weight}$$
$$4 \ \mu m \leq d_1 \leq 30 \ \mu m$$

5. The lenticular lens sheet according to claim 1 or 2, wherein said lens sheet satisfies the following expression.

$$0.01 \leq \Delta n_2 \leq 0.12$$
$$3\% \text{ by weight} \leq c_2$$
$$4 \ \mu m \leq d_2 \leq 30 \ \mu m$$

6. The lenticular lens sheet according to claim 1 or 2, wherein said entrance lens has, over the whole width thereof, a shape that makes the light convergent point substantially single in the vicinity of the surface of the exit lens and satisfies the following expression (III)

$$Z(x) = \frac{Cx^2}{1 + \{1 - (K + 1)C^2x^2\}^{\frac{1}{2}}} \quad \text{(III)}$$

wherein C is a main curvature, K is a conic constant, and $-0.8 \leq K \leq 0$.

7. The lenticular lens sheet according to claim 1 or 2, wherein said exit lens layer is formed in such a manner that its thickness at the center of each exit lens becomes smaller with approach to the periphery.

8. The lenticular lens sheet according to claim 1, wherein said lenticular lens sheet is formed by co-extruding a first resin sheet that gives said entrance lens layer and a second resin sheet that gives said exit lens layer, and passing them through a pair of engraved rolls provided with given convexes and concaves.

9. A method of producing a double-sided lenticular lens sheet comprising an entrance lens layer having an entrance lens and an exit lens layer having an exit lens whose lens surface is formed at the light convergent point of the entrance lens, or in the vicinity thereof, wherein said entrance lens layer and said exit lens layer are each formed of a substantially transparent thermoplastic resin and at least said exit lens layer contains light-diffusing fine particles and wherein a difference exists in the light diffusion properties between said entrance lens layer and said exit lens layer, comprising the step of:

co-extruding a first resin sheet that provides said entrance lens layer with a second resin sheet that provides said exit lens layer, and passing the co-extruded first and second resin sheets providing said entrance and exit lens layers through a pair of engraved rolls provided with convexes and concaves.

* * * * *

UNITED STATES PATENT AND TRADEMARK OFFICE
CERTIFICATE OF CORRECTION

PATENT NO. : 5,196,960
DATED : March 23, 1993
INVENTOR(S) : Ichiro Matsuzaki, et al.

It is certified that error appears in the above-indentified patent and that said Letters Patent is hereby corrected as shown below:

Column 5, lines 4 and 6, "gravity" should read --density--.

Column 6, lines 16 and 18, "gravity" should read --density--.

Column 14, lines 63 and 65, "gravity" should read --density--.

Signed and Sealed this

Thirtieth Day of May, 1995

Attest:

BRUCE LEHMAN

Attesting Officer

Commissioner of Patents and Trademarks